(12) United States Patent
Czainski et al.

(10) Patent No.: US 9,809,124 B2
(45) Date of Patent: Nov. 7, 2017

(54) CIRCUIT ARRANGEMENT AND METHOD OF OPERATING A CIRCUIT ARRANGEMENT

(71) Applicant: Bombardier Transportation GmbH, Berlin (DE)

(72) Inventors: Robert Czainski, Szczecin (PL); Rinaldo Arnold, Karlsruhe (DE)

(73) Assignee: Bombardier Transportation GmbH, Berlin (DE)

( * ) Notice: Subject to any disclaimer, the term of this patent is extended or adjusted under 35 U.S.C. 154(b) by 264 days.

(21) Appl. No.: 14/434,578

(22) PCT Filed: Oct. 30, 2013

(86) PCT No.: PCT/EP2013/072686
§ 371 (c)(1),
(2) Date: Apr. 9, 2015

(87) PCT Pub. No.: WO2014/067984
PCT Pub. Date: May 8, 2014

(65) Prior Publication Data
US 2015/0298562 A1    Oct. 22, 2015

(30) Foreign Application Priority Data

Nov. 2, 2012 (GB) .................................. 1219724.0

(51) Int. Cl.
*B60L 9/00* (2006.01)
*B60L 11/18* (2006.01)
(Continued)

(52) U.S. Cl.
CPC ............... *B60L 11/182* (2013.01); *B60L 9/00* (2013.01); *B60L 11/1829* (2013.01);
(Continued)

(58) Field of Classification Search
CPC .......................... B60L 11/182; B60L 11/1829; B60L 11/1831; B60L 9/00; B60L 5/005;
(Continued)

(56) References Cited

U.S. PATENT DOCUMENTS 5,207,304 A    5/1993   Lechner et al.
5,942,880 A    8/1999   Akamatsu et al.
(Continued)

FOREIGN PATENT DOCUMENTS

CN         102280944       12/2011
EP         0640254 B1      8/2001
(Continued)

OTHER PUBLICATIONS

James J. et. al. "A Variable Inductor Based Tuning Method for ICPT Pickups." University of Auckland: Faculty of Engineering Papers 2005.
(Continued)

*Primary Examiner* — Brandon S Cole
(74) *Attorney, Agent, or Firm* — The Webb Law Firm (57) ABSTRACT

A circuit arrangement, in particular a circuit arrangement of an electric vehicle for inductive power transfer to the vehicle includes a pick-up arrangement and at least one variable compensating arrangement. The variable compensating arrangement includes a capacitive element, a first switching element and a second switching element. The first switching element and the second switching element are connected in series, and the series connection of the first and the second switching element is connected in parallel to the capacitive element of the variable compensating arrangement. Also disclosed is a method of operating the circuit arrangement and a method of manufacturing the circuit arrangement of the electric vehicle and the electric vehicle.

18 Claims, 2 Drawing Sheets

(51) Int. Cl.
*H02J 5/00* (2016.01)
*H02M 1/42* (2007.01)
*B60L 5/00* (2006.01)
*H02J 7/02* (2016.01)

(52) U.S. Cl.
CPC ........... *B60L 11/1831* (2013.01); *H02J 5/005* (2013.01); *H02M 1/4266* (2013.01); *B60L 5/005* (2013.01); *B60L 2200/26* (2013.01); *B60L 2200/30* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC .. B60L 2200/26; B60L 2200/20; H02J 5/005; H02M 1/4266; Y02T 90/12; Y02T 90/121; Y02T 90/122; Y02T 90/125; Y02T 90/127; Y02T 90/14
USPC .................................................. 307/9.1–10.8
See application file for complete search history.

(56) References Cited

U.S. PATENT DOCUMENTS

| | | | | |
|---|---|---|---|---|
| 6,621,183 | B1* | 9/2003 | Boys ........................ | H02J 5/005 307/145 |
| 2007/0109708 | A1 | 5/2007 | Hussman et al. | |
| 2010/0225271 | A1 | 9/2010 | Oyobe et al. | |
| 2010/0264747 | A1* | 10/2010 | Hall ....................... | B60L 11/182 307/104 |
| 2011/0199061 | A1* | 8/2011 | Shimada ................. | G05F 1/445 323/237 |
| 2011/0254378 | A1 | 10/2011 | Ichikawa et al. | |
| 2011/0285210 | A1* | 11/2011 | Lemmens ............... | H02J 5/005 307/104 |
| 2012/0043930 | A1* | 2/2012 | Scudiere ................. | H01F 38/14 320/108 |
| 2012/0313728 | A1* | 12/2012 | Cairo, Jr. ................. | H02J 3/01 333/174 |
| 2013/0222075 | A1* | 8/2013 | Reedy ....................... | H03J 3/20 333/32 |
| 2014/0097674 | A1* | 4/2014 | Vollenwyder ........... | B60L 5/005 307/9.1 |
| 2014/0225450 | A1* | 8/2014 | Endo ....................... | H01F 38/14 307/104 |

FOREIGN PATENT DOCUMENTS

| | | |
|---|---|---|
| EP | 2196351 A1 | 6/2010 |
| EP | 2345553 A1 | 7/2011 |
| GB | 2491652 A | 12/2012 |
| WO | 9424622 A1 | 10/1994 |
| WO | 9930402 A1 | 6/1999 |
| WO | 2011046453 A1 | 4/2011 |
| WO | 2012030238 A1 | 3/2012 |

OTHER PUBLICATIONS

Mattavelli P. et al. "Phasor Dynamics of Thyristor-Controlled Series Capacitor Systems." IEEE Transactions on Power Systems vol. 12, No. 3 (1997): 1259-1267.

Mattavelli P. et. al. "SSR Analysis with Dynamic Phasor Model of Thyristor-Controlled Series Capacitor." IEEE Transactions on Power Systems vol. 14, No. 1 (1999): 200-208.

Watanabe E.H. et. al. "Flexible AC Transmission Systems." Power Electronics Handbook, Elsevier (2007): 797-822.

* cited by examiner

CIRCUIT ARRANGEMENT AND METHOD OF OPERATING A CIRCUIT ARRANGEMENT

CROSS-REFERENCE TO RELATED APPLICATIONS

This application is the United States national phase of International Application No. PCT/EP2013/072686 filed Oct. 30, 2013, and claims priority to United Kingdom Patent Application No. 1219724.0 filed Nov. 2, 2012, the disclosures of which are hereby incorporated in their entirety by reference.

BACKGROUND OF THE INVENTION

Field of the Invention

The invention relates to a circuit arrangement of an electric vehicle, in particular a vehicle-sided circuit arrangement of a system for inductive power transfer to the vehicle. Furthermore, the invention relates to a method of operating the named circuit arrangement. Further, the invention relates to a method of manufacturing a circuit arrangement of an electric vehicle and to an electric vehicle.

Description of Related Art

Electric vehicles, in particular a track-bound vehicle and/or a road automobile, can be operated by electric energy which is transferred by means of an inductive power transfer. Such a vehicle may comprise a circuit arrangement which can be a traction system or a part of a traction system of the vehicle comprising a receiving device adapted to receive an alternating electromagnetic field and to produce an alternating electric current by electromagnetic induction. Furthermore, such a vehicle can comprise a rectifier adapted to convert an alternating current to a direct current. The direct current can be used to charge a traction battery or to operate an electric machine. In the latter case, the direct current can be converted into an alternating current by means of an inverter.

The inductive power transfer is performed using two sets of e.g. three-phase windings. A first set is installed on the ground (primary windings) and can be fed by a wayside power converter (WPC). The second set of windings (secondary windings) is installed on the vehicle. For example, the second set of windings can be attached underneath the vehicle, in the case of trams under some of its waggons. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

Due to presence of a large clearance between the primary windings and the secondary windings, the operational behaviour of this transformer is different than the behaviour of conventional transformers which have a closed magnetic core with negligible or small air gaps. The large air gap results in smaller mutual inductive coupling and larger leakage inductances.

The leakage inductance usually acts as a series inductance with each secondary winding. To be able to transfer high power levels, it is necessary to use an adequate capacitance in order to compensate the reactance of the inductors at an operating frequency of e.g. 20 kHz. With respect to the secondary side of the high frequency transformer, the combination of the inductance(s), which can comprise the main or mutual inductance and/or the leakage inductance, and the capacitance(s), which can comprise the compensating capacitance, forms a resonant circuit. A perfect impedance cancellation happens if impedance values of the inductance(s) and the capacitance(s) are chosen such that the natural resonance frequency of the resonant circuit is equal to the operating frequency. Such a resonant circuit is said to be tuned.

Subject to temperature changes and/or aging, a tolerance of a compensating capacitance can increase. In particular, configurations with magnetically permeable materials tend to drift in the relevant parameters. This may result in a detuning of the resonant circuit, wherein the changed resonant frequency does not correspond to the operating frequency any more. Such a detuning deviates the overall performance and power transfer capability of the inductive power transfer system. Also, an impedance of the secondary side reflected to the primary side of the transformer can become capacitive. This can result in a leading current with respect to the voltage in the WPC which is highly unwanted because a leading current eliminates soft switching conditions of semiconductor switches and increases their power losses considerably. Under such operation conditions, a WPC can overheat and turn off which, in turn, interrupts the needed power transfer.

U.S. Pat. No. 5,207,304 B2 discloses a power pickup system for an electrically powered vehicle. The system comprises a pickup inductor connected to first and second nodes, a power receiving circuit coupled to said first and second nodes, a multiplicity of tuning capacitors, a branch selection means for selecting ones of said multiplicity of tuning capacitors to be coupled to said first and second nodes and for generating a selected signal for each selected tuning capacitor, and a multiplicity of switching circuits, each switching circuit selectively coupling a corresponding tuning capacitor to said first and second nodes. Each switching circuit includes a solid state switch and a trigger circuit coupled to said branch selection means and said solid state switch. Said trigger circuit senses the voltage across said solid state switch and, after receiving one said selection signal from said branch selection means that corresponds to said switching circuit, triggers closure of said solid state switch when said sensed voltage across said solid state switch is approximately zero. Thus, an output current of an inductive coupling system can be controlled by switching a tuning capacitance into or out of the control circuit.

SUMMARY OF THE INVENTION

It is an object of the present invention to provide a circuit arrangement of an electric vehicle, in particular a vehicle-sided circuit arrangement of a system for inductive power transfer to the vehicle, and a method of operating said circuit arrangement by which an inductive power transfer to the vehicle can be optimized even in the case that electrical properties of elements of the circuit arrangement change, wherein the circuit arrangement can be operated with little energy loss and a complexity of controlling the operation of the circuit arrangement is reduced. Further objects of the invention are to provide a method of manufacturing a circuit arrangement and to provide an electric vehicle comprising such a circuit arrangement.

It is a basic idea of the invention to actively vary an impedance of the vehicle-sided circuit arrangement by switching a compensating capacitance into or out of the circuit arrangement such that a desired phase shift between a fundamental frequency of a phase current and a phase voltage of the circuit arrangement is provided, wherein switching times are synchronized to a course of the phase current. By proper controlling of the switching operation, it is possible to compensate a power drop due to changing electrical properties of the compensating capacitance, i.e. detuning, and to keep the system performance at the same level as a perfectly tuned system, wherein an energy loss due to the switching operation is minimal and a complexity of controlling the operation of the circuit arrangement is reduced.

The present invention can be applied to any land vehicle (including but not preferably, any vehicle which is only temporarily on land), in particular track-bound vehicles, such as rail vehicles (e.g. trams), but also to road automobiles, such as individual (private) passenger cars or public transport vehicles (e.g. busses including trolley busses which are also track-bound vehicles).

A circuit arrangement, in particular a circuit arrangement of an electric vehicle for inductive power transfer to the vehicle, is proposed. The circuit arrangement can form a traction system of the electric vehicle or can be a part of the traction system of the electric vehicle. The circuit arrangement comprises a pick-up arrangement. The pick-up arrangement denotes an arrangement of at least one electric element receiving a magnetic field and for generating an electric alternating current output voltage. This electric element can be referred to as source element. The pick-up arrangement can, for instance, comprise a coil. In particular, the pick-up arrangement can comprise secondary windings of a transformer, wherein the transformer is used to transfer energy from route-sided primary windings which can be installed in a ground providing a driving surface for the vehicle, to the vehicle. The pick-up arrangement can be installed at a bottom side of the vehicle, e.g. a side facing the driving surface.

The pick-up arrangement and/or elements of the pick-up arrangement comprise(s) an impedance or provide(s) an impedance. The impedance can be provided by an inductance, in particular a leakage inductance, which is provided at least partly by an air gab between a primary side (primary windings) and the secondary side (secondary windings) of the aforementioned transformer. Furthermore, the impedance can be provided by a resistance, in particular a resistance of the electric lines of the pick-up arrangement.

The circuit arrangement further comprises at least one variable compensating arrangement. The compensating arrangement is used to tune the circuit arrangement. In particular, the compensating arrangement provides an adjustable impedance. Thus, a resonant frequency provided by the circuit arrangement can be adapted to an operating frequency of the aforementioned transformer, e.g. 20 kHz. Thus, changing electric properties of electric elements of the circuit arrangement can be compensated for. The variable compensating arrangement comprises at least one electric element, in particular a capacitive element. The variable compensating arrangement can, for example, comprise a capacitor with a predetermined capacitance. An overall or resulting impedance of the circuit arrangement is therefore provided by the connection of the aforementioned pick-up arrangement and the variable compensating arrangement. Thus, the overall or resulting impedance of the circuit arrangement can be varied depending on the impedance of the variable compensating arrangement.

According to the invention, the variable compensating arrangement further comprises a first switching element and a second switching element, wherein the first switching element and the second switching element are connected in series. The series connection of the first and second switching element is connected in parallel to the capacitive element of the variable compensating arrangement. The switching elements can be operated in a first operating mode, wherein the switching elements are opened in the first operating mode and a current flow through the switching elements is disabled (opened state). In a second operating mode, the switching elements are closed and a current flow through the switching elements is enabled (closed state).

The variable compensating arrangement provides a so-called tuning circuit or can be a part of a tuning circuit. By controlling the operating mode of the switching elements, an impedance of the variable compensating arrangement can be varied. Thus, the aforementioned overall or resulting impedance of the circuit arrangement can be varied. The switch arrangement can have a bidirectional behavior and can be capable of carrying a current and of blocking a voltage in two opposite directions. The switch arrangement, i.e. the series connection of the first and the second switching element, acts as a bypass and enables or disables a current flowing through the capacitive element of the variable compensating arrangement.

A voltage falling across the capacitive element is generated by the aforementioned current which is controlled by the operating mode of each switching element. The voltage falling across the capacitive element is injected into the proposed circuit arrangement. By means of controlling the operating mode it is possible to regulate the phase voltage or phase current such that a fundamental frequency component of the phase voltage has a −90° phase-shift to the phase current of the circuit arrangement such that the circuit arrangement provides a capacitive behavior.

To summarize, the variable compensating arrangement provides a variable capacitance which can be adjusted by controlling the operating mode of the switching elements. The proposed circuit arrangement therefore advantageously allows adjusting an impedance of the circuit arrangement by adjusting the variable capacitance of the variable compensating arrangement. Thus, the impedance of the proposed circuit arrangement can be adjusted such that a resonant frequency of the circuit arrangement is equal to a predetermined operating frequency. Thus, a detuning of the circuit arrangement subject to e.g. temperature changes and/or aging can be compensated for. The proposed circuit arrangement also advantageously allows reducing a complexity of varying the impedance of the circuit arrangement and reducing an energy loss while operating the switching elements. This will be explained later.

In another embodiment, the variable compensating arrangement is connected in series to the pick-up arrangement. In particular, the variable compensating arrangement can be connected to an output of the pick-up arrangement, in particular to the output of one phase of the pick-up arrangement. Thus, the variable compensating arrangement can be arranged between the output of the pick-up arrangement and an element connected to an output of the proposed circuit arrangement, e.g. a load. If the circuit arrangement comprises multiple phases, e.g. three phases, a variable compensating arrangement can be connected in series to the pick-up arrangement in each of the three phases. The series connection of the variable compensating arrangement(s) to the pick-up arrangement advantageously allows a simple modification of the overall or resulting impedance of the proposed circuit arrangement. In particular, the overall or resulting impedance can be a sum of an impedance of the pick-up arrangement and the variable impedance of the variable compensating arrangement.

In another embodiment, the circuit arrangement further comprises at least one static compensating element. The static compensating element can be a capacitive element with a predetermined capacitance. For instance, the static compensating element can be a capacitor with a predetermined capacitance. In this case, the resulting or overall impedance of the proposed circuit arrangement depends also on the impedance of the static compensating element. The pick-up arrangement, the static compensating element and the variable compensating arrangement are connected in series. Thus, an overall or resulting impedance of the proposed circuit arrangement is the sum of the impedance of the pick-up arrangement, the impedance of the static compensating element and the variable impedance of the variable compensating arrangement. The static compensating element can be used to provide a tuned circuit arrangement under normal or initial operating conditions, e.g. if there is no altering influence of aging and/or temperature. Under these conditions, the impedance of the variable compensating arrangement can be set to zero. If, e.g. because of temperature changes and/or aging the impedance of the pick-up arrangement and/or the impedance of the static compensating element changes, the impedance of the variable compensating arrangement can be adjusted such that a tuned circuit arrangement is provided.

In another embodiment, the first switching element and/or the second switching element are semiconductor elements. In particular, the switching elements can be semiconductor switches. For example, the first and/or the second switching element can be a MOSFET or an IGBT. Also, the first and/or the second switching element can be (a) solid state switch(es). This advantageously allows providing the aforementioned variable compensating arrangement with readily available components. Also, semiconductor switches advantageously allow a simple and effective control of a current flow though the semiconductor elements. In particular, the semiconductor elements can be controlled by gate signals which can e.g. be generated by a control unit.

In another embodiment, the first switching element has a conducting direction and the second switching element has a conducting direction. The first and the second switching element are connected such that the conducting direction of the first switching element is oriented opposite to the conducting direction of the second switching element. In other words, the conducting direction of the first switching elements points into the opposite direction of the conducting direction of the second switching element. This advantageously provides a bidirectional behavior of the switch arrangement. In particular, the switch arrangement is capable of carrying and blocking current flow through the switch arrangement.

In another embodiment, a first diode is connected anti-parallel to the first switching element and a second diode is connected anti-parallel to the second switching element. Anti-parallel means that a conducting direction of the first diode is opposite to the aforementioned conducting direction of the first switching element. Also, the conducting direction of the second diode is opposite to the aforementioned conducting direction of the second switching element. This advantageously enhances the bidirectional behavior of the switch arrangement. In particular, in the case of the conducting direction of the first switching element being opposite to the conducting direction of the second switching element, a current flowing in a first direction flows through e.g. the first switching element which is operated in the second operating mode (closed state) and the second diode, wherein the second switching element is operated in the first operating mode (opened state). A current flowing in a second direction opposite to the first direction can flow through the second switching element which is operated in a second operating mode (closed state) and the first diode, wherein the first switching element is operated in the first operating mode (opened state). Thus, for each direction of the current flow, only one switching element needs to be triggered or controlled such that the switching element is in the second operating mode (closed state). Another advantage of arranging the diodes is that a closing of the switching elements, e.g. a change from the first to the second operating mode, occurs autonomously due to the diodes placed inside the bidirectional switch arrangement.

In another embodiment, the circuit arrangement comprises at least one current sensing means for sensing a phase current of the circuit arrangement, wherein switching times or switching instances of the first and the second switching element are controllable depending on the phase current. In particular, the switching times can be controlled depending on an amplitude of the phase current. Preferably, the switching elements can be operated in a periodical manner synchronized to the phase current. The phase current denotes a current generated by the pick-up arrangement during inductive power transfer. For instance, the first switching element and/or the second switching element can be opened periodically with a certain leading edge phase-delay to a zero crossing instant of the phase current, wherein the phase-delay time is the control variable. This will be explained later in more detail.

Providing at least one current sensing means advantageously allows controlling switching times of the first and/or the second switching elements such that an energy loss during the switching operation is minimized while a desired phase shift between the phase current and the phase voltage (and thus a desired impedance) is provided.

In another embodiment, the circuit arrangement comprises at least one voltage sensing means for sensing a voltage falling across the capacitive element of the variable compensating arrangement. The switching times or switching instances of the first and the second switching element are controllable depending on the aforementioned voltage. This advantageously allows triggering the first and/or the second switching element at a point in time where a voltage falling across the series connection of the first and the second switching element is minimal, preferably zero. This advantageously allows reducing an energy loss caused by the switching operation.

In another embodiment, the circuit arrangement comprises a control unit which is adapted to control an operating mode of the first and/or the second switching element. In particular, the control unit can generate gate signals for the switching elements. If the gate signal is, for instance, a high level signal, the switching element is operated in the second operating mode (closed state). If the gate signal is a low level signal, the switching element is operated in the first operating mode (opened state). The control unit can also control a duration of an on-time and an off-time of the respective switching element, wherein the on-time is a time period during which the switching element is operated in the second operating mode and the off-time is a time period during which the switching element is operated in the first operating mode. The control unit can be connected to the aforementioned current sensing means and/or voltage sensing means. Thus, the control unit can be operated such that a desired overall or resulting impedance of the proposed circuit arrangement is provided while an energy loss caused by the switching operation is minimized.

In another embodiment, the circuit arrangement comprises three phases, wherein each of the phases comprises at least one variable compensating arrangement. This advantageously allows adjusting or modifying a three-phase circuit arrangement which can e.g. be part of a traction system of an electric vehicle.

Further proposed is a method of operating one of the aforementioned circuit arrangements. An operating mode of the first and second switching element is controlled such that the variable compensating arrangement provides a desired impedance. In particular, an operating mode of the first and the second switching element is controlled such that the variable compensating arrangement provides a desired capacitance. As previously described, the first and the second switching element can be operated in a first operating mode (opened state) and a second operating mode (closed state). In particular, switching times or switching instances of the first switching element and switching times or switching instances of the second switching element can be set such that the variable compensating arrangement provides the desired impedance, in particular the desired capacitance. At a switching instant, an operating mode of a switching element is changed from the first to the second operating mode or from the second to the first operating mode. In other words, the switch provided by the switching element is opened or closed.

The proposed method advantageously allows adjusting an impedance of the proposed circuit arrangement by controlling the operating mode of the switching elements in the proposed circuit arrangement. This allows a simple adjustment or modification of the impedance to provide a tuned circuit arrangement.

In another embodiment, the first and the second switching elements are closed in inactive operating mode of the variable compensating arrangement. Thus, the first and the second switching element are operated in the second operating mode respectively. If both switching elements are closed, a current flowing through the phase within which the variable compensating arrangement is arranged, will bypass the capacitive element of the variable compensating arrangement. In this case, the impedance of the variable compensating element is zero and the overall or resulting impedance of the proposed circuit arrangement is not changed by the variable compensating arrangement.

In another embodiment, the first switching element and/or the second switching element is/are operated in a periodical manner synchronized to a phase current of the circuit arrangement. In particular, the first switching element and/or the second switching element is/are operated in a periodical manner synchronized to the phase current of the phase within which the variable compensating arrangement comprising the switching elements is arranged.

Operating the switching elements in a periodical synchronized to the phase current advantageously allows performing a switching operation, e.g. a change from the first to the second operating mode or vice versa, at a point in time at which a current flow through the switching elements is minimal, preferably zero, or a voltage falling across the switching element(s) is minimal, preferably zero. As described previously, the phase current is an alternating current generated by the pick-up arrangement during inductive power transfer. The alternating current has a fundamental frequency or fundamental component. At certain points in time, the phase current, in particular an amplitude of the phase current, is zero. These points in time are called zero crossing instants. Preferably, a switching operating is performed at a zero crossing instant which results in a so called zero current switching of the switching elements. If the switching operation is performed periodically and synchronized to the, preferably fundamental, frequency of the phase current, switching operations can always be performed at zero crossing instants. This advantageously minimizes an energy loss during switching operations.

In another embodiment, the switching times or switching instances of the first switching element and the second switching element correspond to an instant in time at which a phase current becomes smaller than a predetermined value or a voltage across the capacitive element of the variable compensating arrangement becomes smaller than a predetermined value. If a switching operation is performed with a minimal current, i.e. if a small or minimal current, preferably a zero current, flows through the switching element before or after the switching instant, an energy loss during the switching operation is minimized as explained previously. Due to the proposed arrangement of the switching elements and the capacitive element of the variable compensating arrangement, a switching operation can also be performed if a voltage falling across the series connection of the switching elements (which is equal to a voltage falling across the capacitive element) is smaller than a predetermined value, preferably zero. Correspondingly, this also minimizes an energy loss during the switching operation. This is called zero voltage switching.

In a preferred embodiment, the switching times or switching instances of the first switching element and the second switching element correspond to instants in time at which the phase current becomes zero or the voltage across the capacitive element of the variable compensating arrangement becomes zero. This advantageously reduces an energy loss during a switching operation to a minimum.

Further proposed is a method of manufacturing a circuit arrangement, in particular a circuit arrangement of an electric vehicle for an inductive power transfer to the vehicle. The method comprises the steps of providing a pick-up arrangement, providing at least one variable compensating arrangement, wherein the variable compensating arrangement comprises at least one capacitive element. Furthermore, the method comprises the step of connecting the pick-up arrangement and the variable compensating arrangement, e.g. by a series connection. Furthermore, the method comprises the steps of providing a first switching element and a second switching element and connecting the first switching element and the second switching element in series and connecting the series connection of the first and the second switching element parallel to the capacitive element of the variable compensating arrangement.

By providing the proposed variable compensating arrangement, an existing pick-up arrangement of e.g. an electric vehicle can be modified such that a variable impedance of the resulting circuit arrangement can be provided. Thus, the proposed solution advantageously allows modifying existing circuit arrangements, e.g. traction systems, of electric vehicles.

Further proposed is an electric vehicle, wherein the electric vehicle comprises one of the aforementioned circuit arrangements. The electric vehicle can be road automobile or a track-bound vehicle. The electric vehicle is capable to be provided with electric energy by an inductive power transfer. This can be done while the vehicle is moving (dynamic power transfer, e.g. dynamic charging) or while the vehicle is at a hold (static power transfer, e.g. static charging).

BRIEF DESCRIPTION OF THE DRAWINGS

Examples of the invention will be described with reference to the attached figures showing.

DETAILED DESCRIPTION OF THE INVENTION

Figure 1:
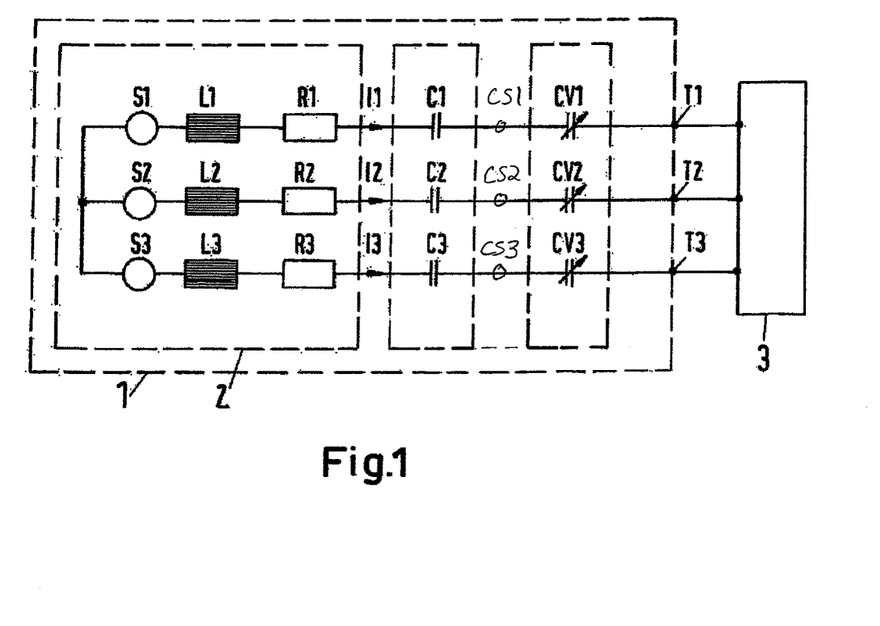
FIG. 1 a schematic circuit diagram of a vehicle-sided circuit arrangement of a system for inductive power transfer to the vehicle, FIG. 2 a schematic circuit diagram of a variable compensating arrangement, and FIG. 3 an exemplary time course of a phase current, a phase voltage and switching times of the switching elements.

FIG. 1 shows a schematic circuit diagram of a vehicle-sided circuit arrangement 1 of a system for inductive power transfer to the vehicle. The circuit arrangement 1 comprises a pick-up arrangement 2, static compensating elements C1, C2, C3 and variable compensating arrangements CV1, CV2, CV3. The circuit arrangement 1 comprises three phases. It is shown, that the pick-up arrangement 2 comprises the source elements S1, S2, S3, leakage inductances L1, L2, L3 and phase resistances R1, R2, R3. In each phase, the respective source element S1, S2, S3, the respective leakage inductance L1, L2, L3 and the respective phase resistance R1, R2, R3 are connected in series. The pick-up arrangement 2 generates alternating phase currents I1, I2, I3 during an inductive power transfer, which phase currents can be sensed by current sensors CS1-CS3. The source elements S1, S2, S3 can be coils providing secondary windings for receiving a magnetic field generated by route-sided primary windings (not shown).

Figure 2:
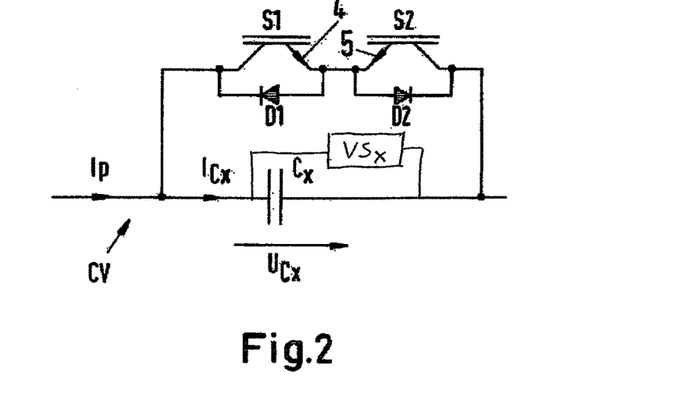

Each phase further comprises one static compensating element C1, C2, C3 which is provided by capacitor with a predetermined capacitance respectively. These static compensating elements C1, C2, C3 are used to tune the circuit arrangement 1 such that the resonant frequencies provided by the series connections of the leakage inductances L1, L2, L3, the phase resistances R1, R2, R3 and the static compensating elements C1, C2, C3 each correspond to an operating frequency of the inductive power transfer which can e.g. be 20 kHz. Each phase further comprises one variable compensating arrangement CV1, CV2, CV3 which is shown in FIG. 2 in more detail. In each phase, the pick-up arrangement 2, i.e. the series connection of the respective source element S1, S2, S3, the respective leakage inductance L1, L2, L3 and the respective phase resistance R1, R2, R3, is connected in series to the respective static compensating element C1, C2, C3 and the respective variable compensating arrangement CV1, CV2, CV3. Also shown is a load 3 which is connected to output terminals T1, T2, T3 of the circuit arrangement 1. Instead of a load 3, it is possible to connect a rectifier to the output terminals T1, T2, T3 to generate a direct current voltage which can be used for charging a traction battery or to provide electric energy to sub-systems of the electric vehicle. For each phase, an overall or resulting impedance of the circuit arrangement 1 is given by the series connection of the respective leakage inductance L1, L2, L3, the respective phase resistance R1, R2, R3, the respective static compensating element C1, C2, C3 and the respective variable compensating arrangement CV1, CV2, CV3. As an impedance, in particular a capacitance, of the variable compensating arrangements CV1, CV2, CV3 can be varied, the resulting or overall impedance of each phase of the circuit arrangement 1 can be varied, too. This, in turn, allows compensating a change of the impedances of the leakage inductance L1, L2, L3, the phase resistance R1, R2, R3 and/or the static compensating element C1, C2, C3. By tuning the impedance of each phase of the circuit arrangement 1, an energy transfer during the aforementioned inductive power transfer using the proposed circuit arrangement 1 can be optimized.

FIG. 2 shows a schematic diagram of a proposed variable compensating arrangement CV. The variable compensating arrangement CV comprises a capacitive element Cx, a first switching element S1 and a second switching element S2. Furthermore, the variable compensating arrangement CV comprises a first diode D1 and a second diode D2. The first diode D1 is connected anti-parallel to the first switching element S1. Correspondingly, the second diode D2 is connected anti-parallel to the second switching element S2. The switching elements S1, S2 can be semiconductor switches. The series connection of the first and the second switching element S1, S2 is connected in parallel to the capacitive element Cx of the variable compensating arrangement CV. It is shown that a conducting direction of the first switching element S1, which is symbolized by an arrow 4, is opposite to a conducting direction of the second switching element S2, which is symbolized by arrow 5. Voltage across capacitive element Cx can be sensed by a voltage sensor VSx.

Also shown is a phase current Ip which corresponds to one of the phase currents I1, I2, I3 shown in FIG. 1. Furthermore, a current $I_{Cx}$ flowing through the capacitance Cx is shown. The shown variable compensating arrangement CV corresponds to one of the variable compensating arrangements CV1, CV2, CV3 shown in FIG. 1.

Figure 3:
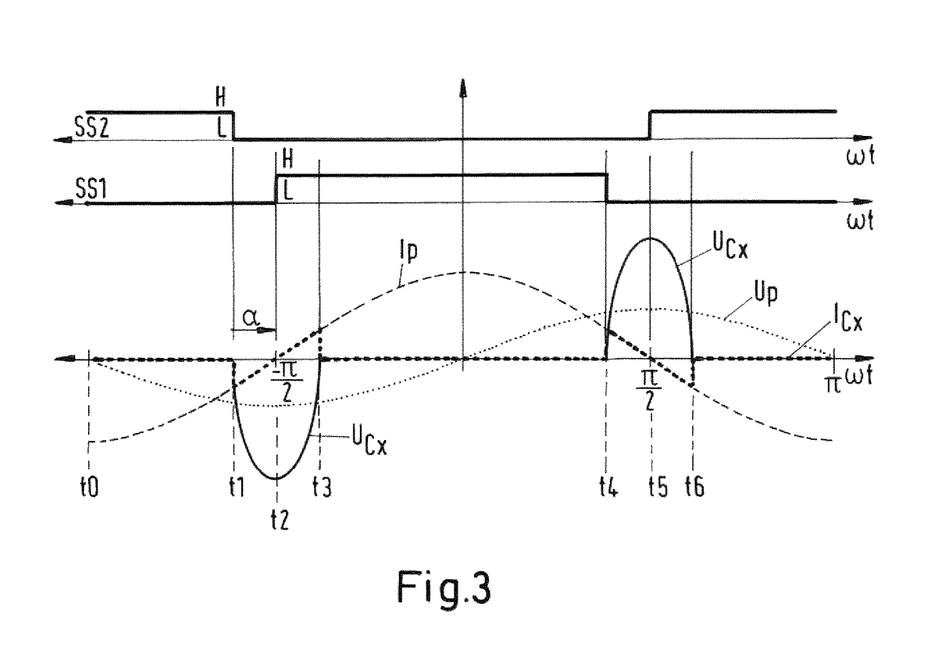

In FIG. 3 an exemplary time course of switching signals SS1, SS2 of the first and the second switching element S1, S2 (see FIG. 2), a phase current Ip, a voltage $U_{Cx}$ falling across a capacitive element Cx of the variable compensating arrangement CV (see FIG. 2), a current $I_{Cx}$ flowing through the capacitive element Cx and a phase voltage Up are shown. The switching signals SS1, SS2 can be high level signals H or low level signals L. If a high level signal H is applied, the switching element S1, S2 is operated in a second operating mode (closed state) and if a low level signal L is applied, the switching element S1, S2 is operated in a first operating mode (opened state). The switching signals SS1, SS2 can be gate signals of semiconductor switches which provide the first and the second switching element S1, S2. At an initial point in time t0, a high level signal H is applied to the second switching element S2. At the same time, a low level signal L is applied to the first switching element S1. At this initial point in time t0, the phase current Ip is negative. Referring to FIG. 2, the phase current Ip flows through the second switching element S2 and the first diode D1. The voltage $U_{Cx}$ falling across the capacitive element Cx is zero. At a first switching instant t1 the switching signal SS2 of the second switching element S2 is turned to a low level signal L. Thus, an operating mode of the second switching element is changed from a second operating mode (closed state) to a first operating mode (opened state). Now, the switch arrangement, i.e. the series connection of the first and the second switching element S1, S2, blocks the phase current Ip which consequently charges the capacitive element Cx. Thus, an absolute value of the voltage $U_{Cx}$ increases.

At a second switching instant t2, the first switching signal SS1 of the first switching element S1 is turned to a high level signal H. The second switching instant t2 corresponds to a zero crossing instant of the phase current Ip. The time axis in FIG. 3 shows a phase angle ωt and the second switching instant t2 corresponds to a phase angle of −π/2 with reference to the phase angle of the phase voltage Up. A time difference between the first switching instant t1 and the second switching instant t2 is expressed in terms of a phase angle α. The angle α is chosen such that a predetermined maximum absolute value of the voltage $U_{Cx}$ during the charging of the capacitive element Cx is achieved. After the second switching instant t2, the capacitive element Cx is discharged and the absolute value of the voltage $U_{Cx}$ decreases, wherein the current $I_{Cx}$ resulting from the discharge provides the phase current Ip.

At a third point in time t3, the capacitive element Cx is completely discharged and the phase current Ip changes its current path and flows through the first switching element S1 and the second diode D2. At a third switching instant t4, the first switching signal SS1 is turned from a high level signal H to a low level signal L. Thus, the current flow through the series connection of the switching elements S1, S2 is blocked and the phase current consequently corresponds to the current $I_{Cx}$ charging the capacitive element Cx. At a fourth switching instant t5, the second switching signal SS2 of the second switching element S2 is turned from a low level signal L to a high level signal H. Again, the capacitive element Cx discharges, wherein the current $I_{Cx}$ resulting from the discharge provides the phase current Ip. A time difference between the third and the fourth switching instant t4, t5 can be expressed by the angle α. At a sixth point in time t6, the capacitive element Cx is completely discharged and the phase current Ip changes its current path and now flows through the second switching element S2 and the first diode D1.

A control unit (not shown) can be used to synchronize the switching instances t1, t2, t4, t5 with the phase current Ip flowing through the circuit arrangement 1 (see FIG. 1). The control unit can e.g. generate gate pulses or gate signals which can be equal to the switching signals SS1, SS2 shown in FIG. 3. In an inactive operation of the variable compensating arrangement CV1, CV2, CV3, CV (see FIG. 1 or FIG. 2) the switching elements will be closed and the series connection of the switching elements S1, S2 acts as a bypass for the phase current Ip with respect to the capacitive element Cx. In a normal operation, the switching elements S1, S2 will be opened and closed periodically with a certain leading edge phase-delay (which corresponds to the phase angle α) to the zero crossing instants t2, t5 of the phase current Ip. The phase-delay time (denoted by α) can be a control variable for controlling the resulting capacitance provided by the variable compensating arrangement CV (see FIG. 2). After opening the switching element S1, S2, e.g. at the switching time instants t1, t4, the phase current Ip commutates from the series connection of the switching elements S1, S2 to the capacitive element Cx. The voltage $U_{Cx}$ falling across the capacitive element Cx starts to increase until the current zero crossing instant t2, t5 respectively. After the zero crossing instant t2, t5, the voltage $U_{Cx}$ falling across the capacitance Cx decreases until it reaches zero again. At this instant, the phase current Ip commutates from the capacitive element Cx back to the series connection of the switching elements S1, S2. The switch openings, e.g. at the first and the third switching time instant t1, t4, are triggered by a control logic. The switch closings e.g. at the second and the fourth switching instant t2, t5 occurs autonomously due to the diodes D1, D2 placed inside the bidirectional switch arrangement provided by the series connection of the first and the second switching element S1, S2.

The invention claimed is:

1. A circuit arrangement of an electric vehicle for inductive power transfer to the vehicle, the circuit arrangement comprising:
   a pick-up arrangement for receiving a magnetic field and for generating an output voltage, and at least one variable compensating arrangement, wherein the variable compensating arrangement comprises a capacitive element, wherein:
   the variable compensating arrangement further comprises a first switching element and a second switching element, wherein the first switching element and the second switching element are connected in series, wherein the series connection of the first and the second switching element is connected in parallel to the capacitive element of the variable compensating arrangement; and
   the circuit arrangement comprises at least one current sensing means for sensing a phase current of the circuit arrangement, wherein switching times of the first and the second switching element are controllable depending on the phase current.

2. The circuit arrangement according to claim 1, wherein the variable compensating arrangement is connected in series to the pick-up arrangement.

3. The circuit arrangement according to claim 1, wherein the circuit arrangement comprises at least one static compensating element, wherein the pick-up arrangement, the static compensating element and the variable compensating arrangement are connected in series.

4. The circuit arrangement according to claim 1, wherein the first switching element and/or the second switching element is/are (a) semiconductor element(s).

5. The circuit arrangement according to claim 1, wherein the first switching element has a conducting direction and the second switching element has a conducting direction, wherein the first and the second switching element are connected such that the conducting direction of the first switching element is opposite to the conducting direction of the second switching element.

6. The circuit arrangement according to claim 5, wherein a first diode is connected anti-parallel to the first switching element and a second diode is connected anti-parallel to the second switching element.

7. The circuit arrangement according to claim 1, wherein a first diode is connected anti-parallel to the first switching element and a second diode is connected anti-parallel to the second switching element.

8. The circuit arrangement according to claim 1, wherein the circuit arrangement comprises at least one voltage sensing means for sensing a voltage across the capacitive element of the variable compensating arrangement, wherein the switching times of the first and the second switching element are controllable depending on the voltage.

9. The circuit arrangement according to claim 1, wherein the circuit arrangement comprises a control unit which is adapted to control an operating mode of the first and the second switching element.

10. The circuit arrangement according to claim 1, wherein the circuit arrangement comprises three phases, wherein each of the phases comprises at least one variable compensating arrangement.

11. A method of operating a circuit arrangement comprising a pick-up arrangement for receiving a magnetic field and for generating an output voltage, and at least one variable compensating arrangement, wherein the variable compensating arrangement comprises a capacitive element, wherein the variable compensating arrangement further comprises a first switching element and a second switching element, wherein the first switching element and the second switching element are connected in series, wherein the series connection of the first and the second switching element is connected in parallel to the capacitive element of the variable compensating arrangement; and wherein the circuit arrangement comprises at least one current sensing means for sensing a phase current of the circuit arrangement, wherein switching times of the first and the second switching element are controllable depending on the phase current, wherein the method comprises:

an operating mode of the first and the second switching element is controlled such that the variable compensating arrangement provides a desired impedance.

12. The method of claim 11, wherein the first and the second switching element are closed in an inactive operating mode of the variable compensating arrangement.

13. The method of claim 11, wherein the first switching element and/or the second switching element is/are operated in a periodical manner synchronized to a phase current of the circuit arrangement.

14. The method of claim 13, wherein the switching times of the first switching element and the second switching element correspond to an instant in time at which a phase current becomes smaller than a predetermined value or a voltage across the capacitive element of the variable compensating arrangement becomes smaller than a predetermined value.

15. The method of claim 11, wherein the switching times of the first switching element and the second switching element correspond to an instant in time at which a phase current becomes smaller than a predetermined value or a voltage across the capacitive element of the variable compensating arrangement becomes smaller than a predetermined value.

16. The method of claim 15, wherein the switching times of the first switching element and the second switching element correspond to an instant in time at which the phase current becomes zero or the voltage across the capacitive element of the variable compensating arrangement becomes zero.

17. A method of manufacturing a circuit arrangement of an electric vehicle for an inductive power transfer to the vehicle comprising:

providing a pick-up-arrangement for receiving a magnetic field and for generating an output voltage;

providing at least one variable compensating arrangement, wherein the variable compensating arrangement comprises a capacitive element;

connecting the pick-up arrangement and the variable compensating arrangement;

providing a first switching element and a second switching element;

connecting the first switching element and the second switching element in series;

connecting the series connection of the first and the second switching element parallel to the capacitive element of the variable compensating arrangement; and providing a current sensor for sensing a current flow in the at least one variable compensating arrangement.

18. An electric vehicle comprising the circuit arrangement of claim 1.

* * * * *